US008180981B2

(12) United States Patent
Kapil et al.

(10) Patent No.: US 8,180,981 B2
(45) Date of Patent: May 15, 2012

(54) CACHE COHERENT SUPPORT FOR FLASH IN A MEMORY HIERARCHY

(75) Inventors: Sanjiv Kapil, Cupertino, CA (US); Ricky C. Hetherington, Pleasanton, CA (US)

(73) Assignee: Oracle America, Inc., Redwood City, CA (US)

( * ) Notice: Subject to any disclaimer, the term of this patent is extended or adjusted under 35 U.S.C. 154(b) by 453 days.

(21) Appl. No.: 12/466,643

(22) Filed: May 15, 2009

(65) Prior Publication Data

US 2010/0293420 A1 Nov. 18, 2010

(51) Int. Cl.
*G06F 13/00* (2006.01)
*G06F 13/28* (2006.01)
*G06F 11/00* (2006.01)
*G11C 29/00* (2006.01)
*G11C 11/34* (2006.01)

(52) U.S. Cl. . 711/159; 711/103; 711/141; 711/E12.001; 711/E12.008; 711/E12.022; 711/E12.026; 711/E12.084; 365/185.08; 365/185.12; 714/54; 714/710

(58) Field of Classification Search .................... 711/51, 711/103, 141, 159, E12.001, E12.008, E12.022, 711/E12.026, E12.084; 365/185.08, 185.12; 714/54, 710
See application file for complete search history.

(56) References Cited

U.S. PATENT DOCUMENTS

| | | | |
|---|---|---|---|
| 5,590,076 A | 12/1996 | Haddad et al. | |
| 5,899,994 A | 5/1999 | Mohamed et al. | |
| 5,956,743 A | 9/1999 | Bruce et al. | |
| 6,263,398 B1 | 7/2001 | Taylor et al. | |
| 6,418,516 B1 | 7/2002 | Arimilli et al. | |
| 6,510,499 B1 * | 1/2003 | Aaker | 711/154 |
| 7,046,554 B2 | 5/2006 | Lee | |
| 7,058,784 B2 | 6/2006 | Wang | |
| 7,180,784 B2 | 2/2007 | Ju | |
| 7,243,185 B2 | 7/2007 | See et al. | |

(Continued)

FOREIGN PATENT DOCUMENTS

WO  WO 2009/048707  4/2009

OTHER PUBLICATIONS

International Search Report and Written Opinion for Application No. PCT/US2010/034897 mailed Nov. 20, 2010.

*Primary Examiner* — Ly D Pham
(74) *Attorney, Agent, or Firm* — Rory D. Rankin; Meyertons, Hood, Kivlin, Kowert & Goetzel

(57) ABSTRACT

System and method for using flash memory in a memory hierarchy. A computer system includes a processor coupled to a memory hierarchy via a memory controller. The memory hierarchy includes a cache memory, a first memory region of random access memory coupled to the memory controller via a first buffer, and an auxiliary memory region of flash memory coupled to the memory controller via a flash controller. The first buffer and the flash controller are coupled to the memory controller via a single interface. The memory controller receives a request to access a particular page in the first memory region. The processor detects a page fault corresponding to the request and in response, invalidates cache lines in the cache memory that correspond to the particular page, flushes the invalid cache lines, and swaps a page from the auxiliary memory region to the first memory region.

15 Claims, 6 Drawing Sheets

U.S. PATENT DOCUMENTS

| | | |
|---|---|---|
| 7,269,708 B2 | 9/2007 | Ware |
| 7,302,517 B2 | 11/2007 | Lim et al. |
| 7,353,326 B2 | 4/2008 | Cho et al. |
| 7,525,842 B2 | 4/2009 | Nguyen et al. |
| 7,571,282 B2 | 8/2009 | Nishihara |
| 7,574,554 B2 | 8/2009 | Tanaka et al. |
| 7,644,224 B2 | 1/2010 | Murin et al. |
| 7,657,699 B2 | 2/2010 | Murin et al. |
| 7,755,950 B2 | 7/2010 | Yu |
| 2004/0143710 A1 | 7/2004 | Walmsley |
| 2005/0235131 A1 | 10/2005 | Ware |
| 2007/0101098 A1 | 5/2007 | Shin et al. |
| 2007/0106853 A1 | 5/2007 | Evanchik |
| 2008/0072031 A1* | 3/2008 | Choi .................. 713/2 |
| 2008/0126749 A1* | 5/2008 | Tom et al. ............ 712/30 |
| 2008/0201540 A1 | 8/2008 | Sahita et al. |
| 2009/0033364 A1* | 2/2009 | Skerlj et al. ........... 326/63 |
| 2009/0043948 A1* | 2/2009 | Wittenburg et al. ...... 711/103 |
| 2009/0187735 A1* | 7/2009 | Lin et al. ............. 712/30 |
| 2010/0017578 A1* | 1/2010 | Mansson et al. ........ 711/171 |
| 2010/0023800 A1* | 1/2010 | Harari et al. ............ 714/2 |

* cited by examiner

CACHE COHERENT SUPPORT FOR FLASH IN A MEMORY HIERARCHY

BACKGROUND OF THE INVENTION

1. Field of the Invention

This invention relates to computer systems, and, more particularly, to memory subsystem hardware to support flash memory.

2. Description of the Related Art

In order to increase the performance of computer systems, system designers may use a hierarchical arrangement of storage devices to take advantage of the memory locality typically exhibited by computer programs. Memory locality, as used herein, refers to the tendency of computer programs to frequently access the same or related storage locations, either in a relatively short time duration or within close proximity. For example, paging may be used in a virtual memory implementation to bring frequently accessed data into main memory from an auxiliary storage device one page at a time. It is assumed that accessing main memory is faster than accessing an auxiliary device, although the auxiliary device may store data for less cost per unit of storage. Alternatively, or in addition, a copy of data that is frequently accessed may be stored in a cache made up of faster devices having a relatively small total capacity. Data may be stored in a cache, one cache line at a time, where a cache line is typically smaller than a page.

Generally speaking, modern computer systems use a hierarchy of memory devices including one or more levels of cache memory in which data is duplicated one cache line at a time, a region of main memory in which data is stored one page at a time, and various levels of auxiliary storage. Cache memory may be coupled closely to a processing unit and/or included within a processing unit. Main memory is generally coupled directly to one or more processing units via a fast system bus. Auxiliary storage may be coupled to one or more processing units via a general purpose I/O interface system such as Parallel ATA (PATA), Serial ATA (SATA), Small Computer System Interface (SCSI), Universal Serial Bus (USB), Peripheral Component Interconnect (PCI), and the like as part of an I/O system hierarchy rather than the more directly coupled memory devices. When a desired page is not found in main memory (referred to as a page fault), the page may be retrieved from auxiliary storage using a technique know as Direct Memory Access (DMA). In DMA, an auxiliary device may directly access memory, transferring a page to or from main memory independently from other processing units. However, most data transfers within the memory hierarchy require the involvement of a central processing unit.

In addition to the above considerations, computer systems may implement various types of parallel processing, for example by providing multiple processing units within the system (also referred to as multi-core processors), or by integrating multiple discrete systems or subsystems together via a network or other type of interconnect to create a still more complex parallel system. In multi-core systems that provide access to shared memory, the possibility exists that two or more independent, concurrently executing processor tasks may attempt to concurrently access the same addressable location in memory. For example, one task may attempt to write the location at the same time the other attempts to read it. Absent some technique to predictably order or regulate such concurrent memory accesses, commonly referred to as a coherence protocol, unpredictable or erroneous execution behavior may result. For example, the two tasks mentioned may produce different computational results depending on the order in which the write occurs relative to the read, which otherwise might be completely random. Similar problems may occur if different processing units in a multi-core system attempt to locally cache shared data.

Coherence issues may also be present when auxiliary devices have access to memory via DMA or otherwise. When a processing unit accesses a particular memory location, it stores the current value from the particular location in cache. If updates to the cache are not propagated to the auxiliary device, the next time the particular location is accessed, a stale version of the data may be loaded from the auxiliary device, overwriting the updates. Computer systems use various coherence protocols to ensure that no processing unit is operating with an out-of-date copy of data. In DMA implementations, cache-coherence may be maintained in hardware or software that flushes cache lines that have been invalidated by a DMA access.

It may be desirable to add low cost storage devices such as flash memory to a computer system's memory hierarchy to lower overall system cost and increase performance compared to auxiliary devices such as hard disk storage. Unfortunately, without DMA access between these storage devices and main memory, cache coherence issues may arise. In addition, these storage devices may require specialized, multi-instruction access operations. Implementing these access operations using a central processing unit may be inefficient. Consequently, what are needed are systems and methods for incorporating flash memory-type storage devices in a computer system's memory hierarchy that account for these issues.

SUMMARY OF THE INVENTION

Various embodiments of a computer system and methods are disclosed. In one embodiment, a computer system includes a processor coupled to a memory hierarchy via a memory controller. The memory hierarchy includes a first memory region of random access memory and an auxiliary memory region of flash memory. The memory controller is coupled to the first memory region via a first buffer and the auxiliary memory region is coupled to the memory controller via a flash controller. The first buffer and the flash controller are coupled to the memory controller via a single interface. The memory controller receives a request to access a particular page in the first memory region. The processor detects a page fault corresponding to the request and in response to detecting the page fault, swaps a page from the auxiliary memory region to the first memory region.

In a further embodiment, the processor includes a command sequencer configured to move data between the auxiliary memory region and the first memory region. To move data between the auxiliary memory region and the first memory region, the command sequencer executes a sequence of micro commands that are stored in the first memory region.

In a still further embodiment, the computer system includes a cache memory and the processor includes a coherence engine. The coherence engine detects a page fault corresponding to the request and in response to detecting the page fault, invalidates cache lines in the cache memory that correspond to the particular page, and flushes the invalid cache lines. In a still further embodiment, the coherence engine flushes the cache lines prior to the command sequencer moving data between the auxiliary memory region and the first memory region.

In a still further embodiment, the first memory region and the auxiliary memory region are interconnected through a cache buffer. To move data from the first memory region to the auxiliary memory region, the processor reads data from the first memory region to the cache buffer and writes data from the cache buffer to the auxiliary memory region. To move data from the auxiliary memory region to the first memory region, the processor reads data from the auxiliary memory region to the cache buffer and writes data from the cache buffer to the first memory region.

In a still further embodiment, a dual in-line memory module in the computer system includes the first memory region, the auxiliary memory region, the first buffer, and the flash controller. In another embodiment, the computer system further includes at least two processors that share the first memory region and the auxiliary memory region.

These and other embodiments will become apparent upon consideration of the following description and accompanying drawings.

Figure 1:
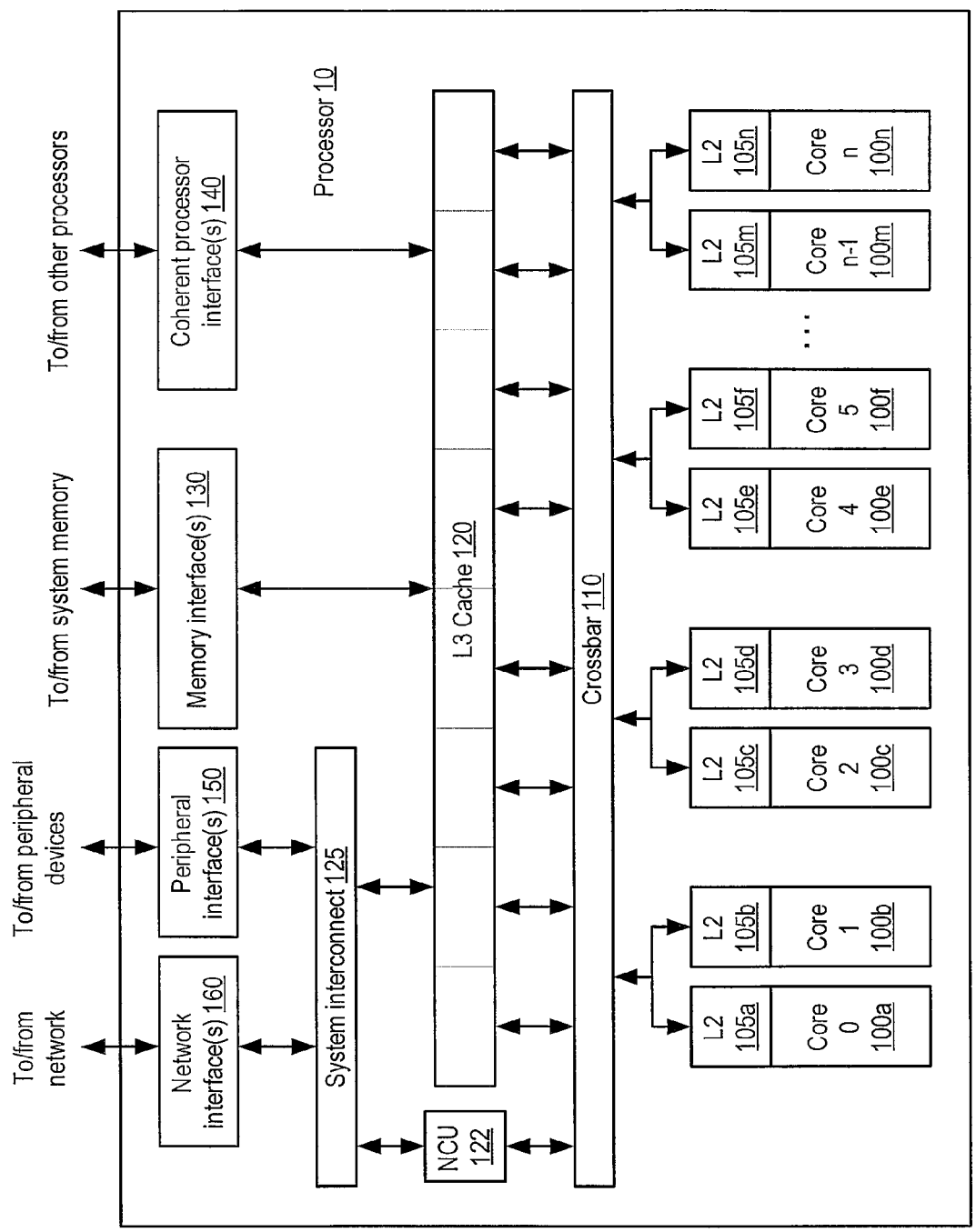
FIG. 1 is a generalized block diagram of one embodiment of a processor that may be coupled to various storage devices including flash memory.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Overview of Multithreaded Processor Architecture

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8-megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configurations are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example, in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
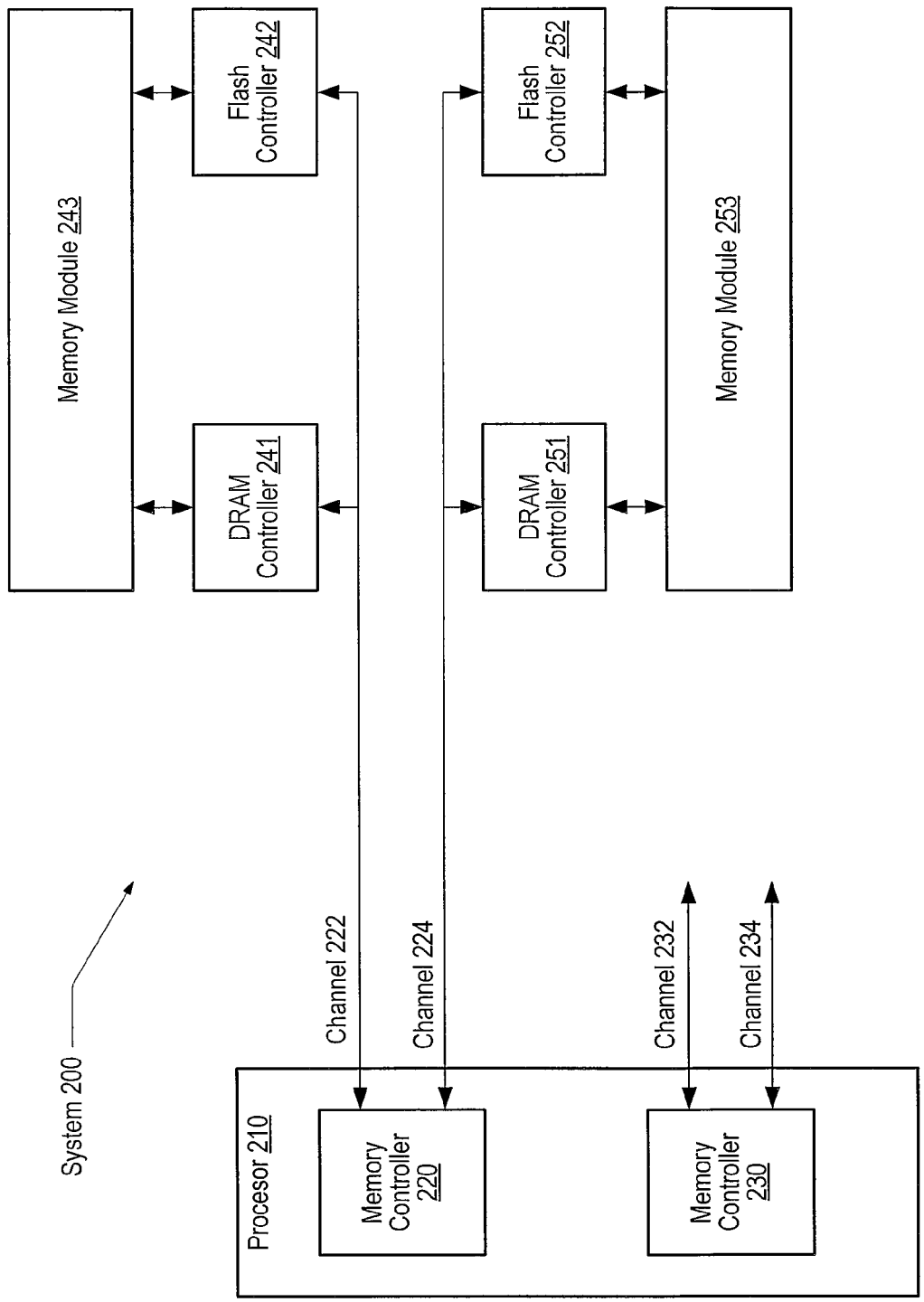
FIG. 2 is a block diagram illustrating one embodiment of a memory system coupled to a processor.

Turning now to FIG. 2, a block diagram illustrating one embodiment of a memory system 200 coupled to a processor 210 is shown. In the illustrated embodiment, processor 210 includes memory controllers 220 and 230, each of which is coupled to memory modules via two separate channels or links. In one embodiment, each channel or link may include one or more lanes in each direction, forming a bidirectional data path between the memory controller and various memory devices. In alternative embodiments, each memory controller may support one, two, or more channels and processor 210 may include more or fewer than two memory controllers. In the illustrated embodiment, memory controller 220 is shown coupled via a channel 222 to a DRAM controller 241 and a flash controller 242, which are in turn coupled to a memory module 243. Memory controller 230 is shown coupled via a channel 224 to a DRAM controller 251 and a flash controller 252, which are in turn coupled to a memory module 253. Memory controller 220 may also be coupled to additional memory components (not shown) via channels 232 and 234.

During operation, a memory request targeting a region of memory within memory module 243 may be placed on channel 222 by memory controller 220. DRAM controller 241 or flash controller 242 may process the memory request in response to detecting that the memory request is targeted to a region of memory within memory module 243. Further details of the operation of DRAM controller 241 and flash controller 242 are presented below.

Figure 3:
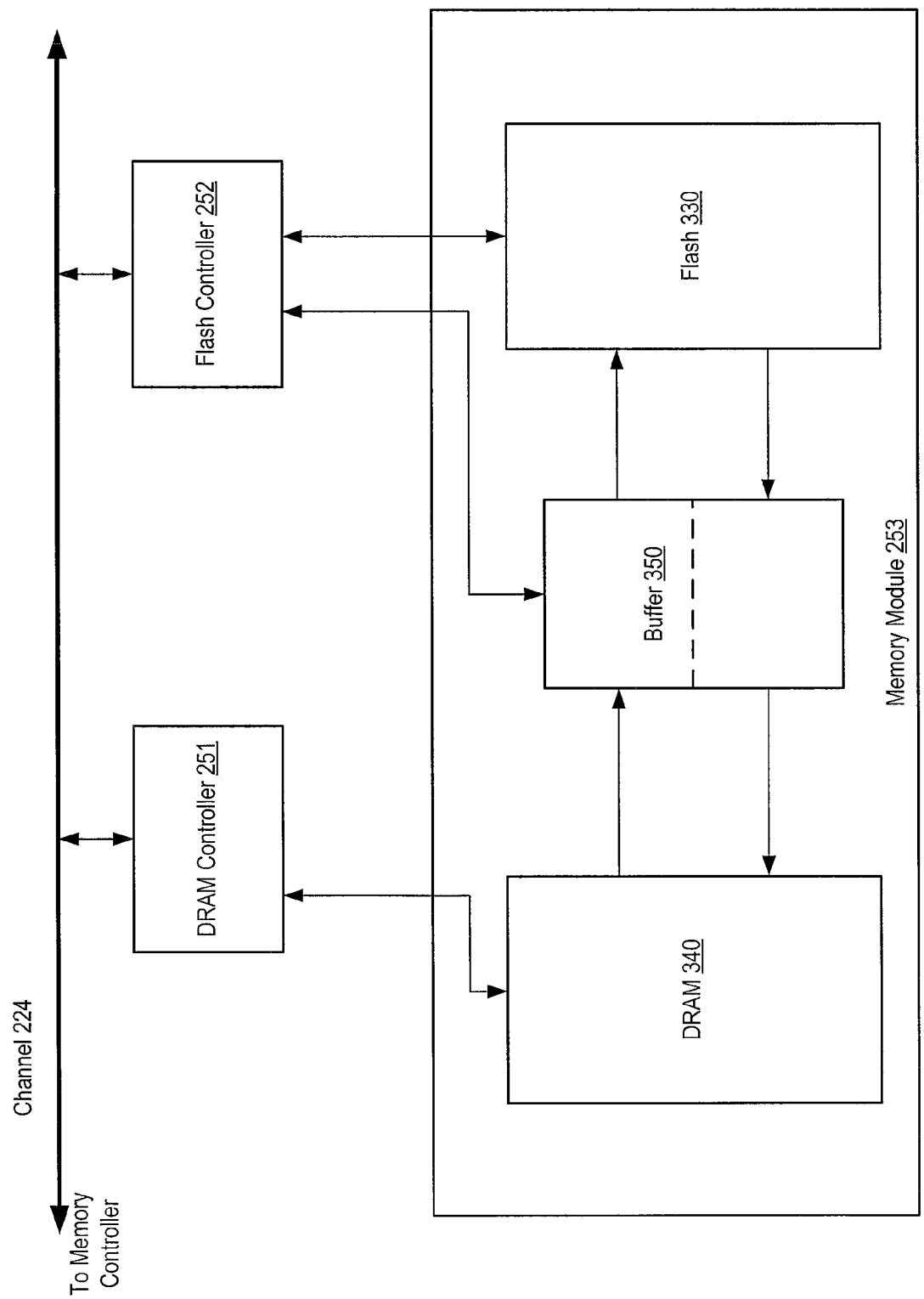
FIG. 3 is a more detailed block diagram of one embodiment of a portion of a memory system.

FIG. 3 is a more detailed block diagram of one embodiment of a portion of memory system 200. In the illustrated embodiment, memory module 253 is shown coupled via DRAM controller 251 and flash controller 252 to channel 224. Memory module 253 includes a DRAM 340, a flash memory 330, and a bidirectional buffer 350 (cache). Flash 330 and DRAM 340 are shown interconnected through buffer 350.

DRAM 340 represents any of a variety of random access storage devices, such as Double Data Rate or Double Data Rate 2 Synchronous Dynamic Random Access Memory (DDR/DDR2 SDRAM), or Rambus DRAM (RDRAM), for example. (Rambus and RDRAM are registered trademarks of Rambus Inc.). DRAM 340 may include one or more independent sets (ranks) of storage devices arranged in any of a variety of physical layouts as are known to one skilled in the art. In one embodiment, DRAM 340 may have a total capacity of 1 Gigabyte-8 Gigabytes. In one embodiment, DRAM controller 251 may provide a JEDEC-compliant interface to DRAM 340. For example, DRAM controller 251 and DRAM 340 may comprise a fully buffered DIMM (FB_DIMM) in which DRAM controller 251 is an advanced memory buffer (AMD).

Flash 330 may include one or more Electrically Erasable Programmable Read-Only Memory (EEPROM) storage devices (chips) arranged in an array. In one embodiment, flash 330 may comprise one or more NAND devices that may be accessed in blocks. In one embodiment, flash 330 may have a total capacity of 62.5 Gigabytes to 32 terabytes. Some example block sizes are 16 Kbytes, 128 Kbytes, 256 Kbytes, 512 Kbytes, etc., where each block may include multiple pages of storage. Buffer 350 may include any of a variety of random access storage devices such as DRAM or SRAM. In one embodiment, buffer 350 may have a total capacity of 8 Mbytes to 128 Mbytes.

In an alternative embodiment, memory module 253 may be a single apparatus such as a DIMM that includes DRAM 340, flash memory 330, and a bidirectional buffer 350. In this embodiment, DRAM controller 251 and flash controller 252 may be implemented as a single active controller, either separate from or included on memory module 253 and configured to coordinate the transfers between flash memory 330 and DRAM 340 for memory accesses that miss in DRAM space. During operation, data transfers between DRAM 340 and flash 330 may be buffered through buffer 350 in order to adapt access rate differences between DRAM 340 and flash 330. For example, to transfer data from flash 330 to DRAM 340, data may be transferred from flash 330 to buffer 350 and subsequently transferred from buffer 350 to DRAM 340. Similarly, to transfer data from DRAM 340 to flash 330, data may be transferred from DRAM 340 to buffer 350 and subsequently transferred from buffer 350 to flash 330. In one embodiment, buffer 350 may be a single storage device having two read/write ports. In an alternative embodiment, buffer 350 may be implemented as two separate physical devices. In either embodiment, during a data transfer, a distinct physical address may be allocated for a transfer from DRAM 340 to flash 330 and a different physical address may be allocated for a transfer from flash 330 to DRAM 340, allowing the two transfers to occur simultaneously.

Figure 4:
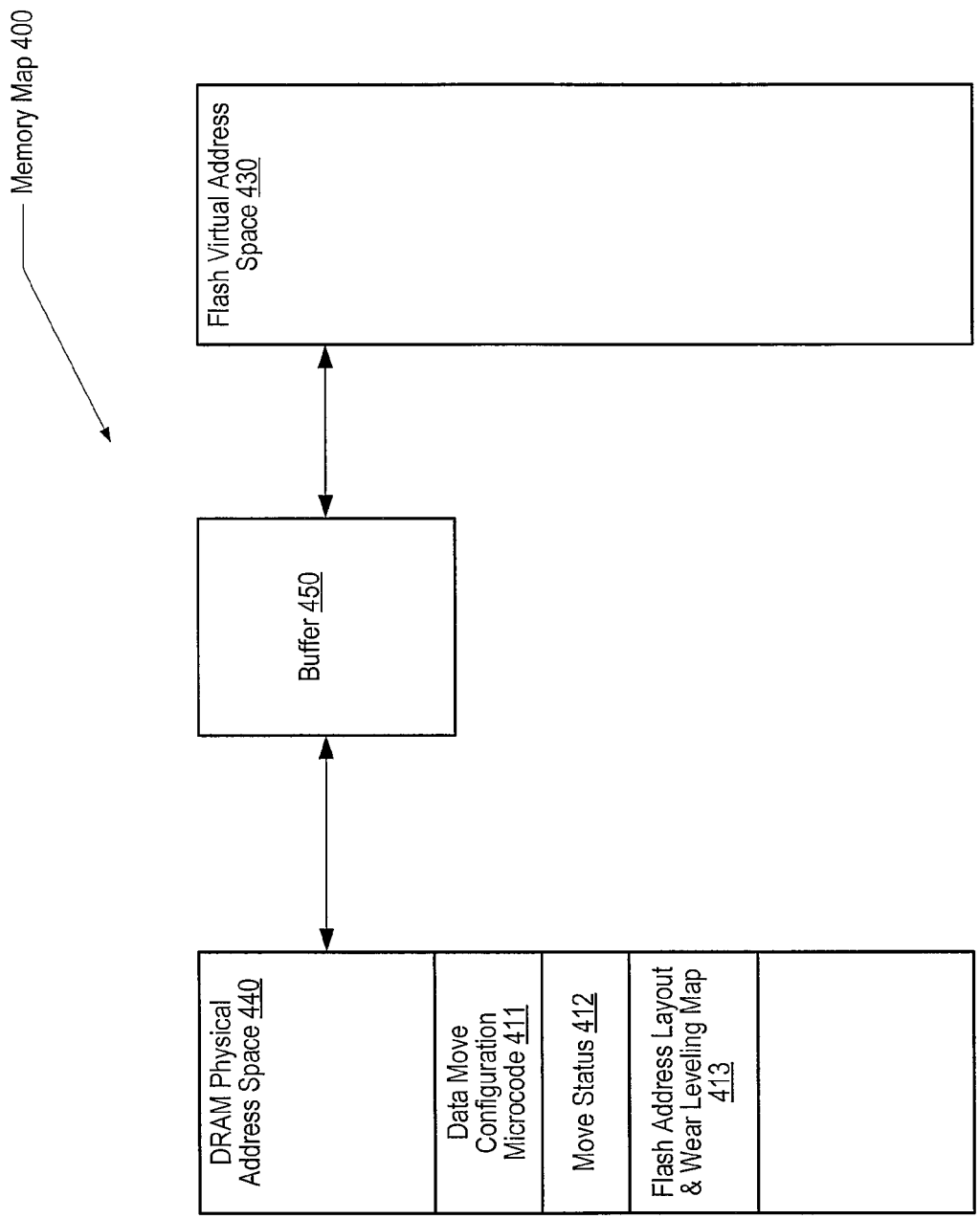
FIG. 4 illustrates one embodiment of a memory map that may be implemented within a memory system.

FIG. 4 illustrates one embodiment of a memory map that may be implemented within memory system 200. In the illustrated embodiment, one or more regions of a flash virtual address space 430 may be mapped through a buffer 450 to a DRAM physical address space 440. DRAM physical address space 440 includes a space 411 for data move configuration microcode, a space 412 for move status information, and a space 413 for flash address layout information and a wear-leveling map. Space 413 for flash address layout information and a wear leveling map may be used to handle normal flash operations and will not be described further herein. The uses of other portions of DRAM physical address space 440 are described below.

In one embodiment, data transfers from flash 330 may be performed by execution of a series of microcode instructions. For example, flash controller 252 may execute microcode instructions that are stored at system initialization time in a pre-determined region of DRAM 340, for example, data move configuration space 411 as illustrated in FIG. 4. Instructions may be written into data move configuration space 411 by the host processor using a pre-defined format. The flash-related commands for which microcode may be provided are listed in Table 1.

TABLE 1

| Command | Operation |
| --- | --- |
| Read | Standard flash-specific command |
| Read for Copyback | Standard flash-specific command |
| Two Plane Page Read | Standard flash-specific command |
| Two Plane Read For Copyback | Standard flash-specific command |
| Page Program | Standard flash-specific command |
| Page Program With 2 KB Data | Standard flash-specific command |
| Two Plane Page Program | Standard flash-specific command |
| Copyback Program | Standard flash-specific command |
| Two Plane Copyback Program | Standard flash-specific command |
| Random Data Input | Standard flash-specific command |
| Random Data Output | Standard flash-specific command |
| Two Plane Random Data Output | Standard flash-specific command |
| Read Status | Standard flash-specific command |
| Read EDC Status | Standard flash-specific command |
| Block Erase | Standard flash-specific command |
| Two Plane Block Erase | Standard flash-specific command |
| Move_F_C1$ Addr1, Addr2 | Move data from Addr1 in flash to Addr2 in Cache1 |
| Move_F_D Addr1, Addr2 | Move data from Addr1 in flash to Addr2 in DRAM |
| Move_F_C2$ Addr1, Addr2 | Move data from Addr1 in flash to Addr2 in Cache2 |
| Move_C1$_D Addr1, Addr2 | Move data from Addr1 in Cache1 to Addr2 in Cache2 |
| Move_C2$_D Addr1, Addr2 | Move data from Addr1 in Cache2 to Addr2 in DRAM |
| Move_D_C1$ Addr1, Addr2 | Move data from Addr1 in DRAM to Addr2 in Cache1 |
| Move_D_C2$ Addr1, Addr2 | Move data from Addr1 in DRAM to Addr2 in Cache2 |

The commands listed in Table 1 may be encoded in a 64-bit frame using 4 bits to indicate a category among four general categories, 4 bits to indicate a command flavor (subtype) within each command type, 3 bits to indicate a plane within a multi-plane flash device, and 48 address bits to indicate a virtual address within the flash virtual memory space. In one embodiment, the 48-bit address field may be sub-divided into fields for a DIMM ID, a Device ID, a block ID, and a page ID. Table 2 illustrates command categories and flavors within each category of commands.

TABLE 2

| Command Category | Command Flavor |
| --- | --- |
| Read | Copyback |
|  | Cached Read |
|  | Config Read |
|  | Data Read |
|  | Status Read |
|  | Error Status |
| Program | Copyback |
|  | Random Data |
|  | I/P |
| Erase | Block |
| Move | Flash to cache |
|  | Cache to DRAM |
|  | DRAM to cache |
|  | Cache to flash |

During operation, the host processor's memory controller may issue any of the above commands as a configuration command directed to write into data move configuration space 411. Flash controller 252 may be configured to intercept the above commands and interpret the bit fields of the command. In one embodiment, each of the above commands may be distinguished by its target address as being flash-specific so as to be decoded by flash controller 252, not by DRAM controller 251

In one embodiment, each of the commands shown in Table 2 may be implemented as a sequence of micro commands. For example, a move command from flash to DRAM may be decoded as a read from flash followed by a write to DRAM and a move command from DRAM to flash may be decoded as a read from DRAM followed by a write to flash. Each micro command sequence may be stored in data move configuration space 411 in a command structure of micro commands, such as a linked list or ring buffer, that is constructed at power-on time by initialization code. In a linked list implementation, the last node of the list may be a null node to indicate the end of the sequence. In a buffer implementation, the list node may point back to the first node to indicate the end of the sequence. In either implementation, the address of the head node may be used to locate a given sequence in data move configuration space. In one embodiment, a command engine comprising a state machine or micro-sequencer within host processor 210 may fetch and decode micro commands from data move configuration space 411. Decoded data movement commands that are purely DRAM specific may be written to a memory controller queue to be handled by a memory controller scheduler. The memory controller scheduler may perform dependency checks on these commands as with other commands coming from level-2 cache or I/O DMA operations. Each command structure may include a completion bit stored in move status space 412 indicating completion of the corresponding sequence. Assertion of a completion bit may cause a trap to be returned to the originating thread within the host processor. If the completion bit is not asserted, the state machine's sequence flow may proceed to the next micro command. In an alternative embodiment, all flash related operations including data movements to or from DRAM as well as last level cache coherence operations in response to a page fault may be implemented in a software driver that takes advantage of DMA-like capabilities of flash controller 252.

In one embodiment, flash-related commands may be issued as DRAM write commands including a payload to be written to data move configuration space 411 that includes a micro command sequence. Flash controller 252 may decode the payload to determine the micro commands as well as the address values in flash memory and in DRAM.

In addition, in one embodiment, a command to move data from flash 300 to DRAM 340 may be implemented, as noted above, as a data move from flash 300 to cache buffer 350 followed by a data move from the buffer to DRAM 340. The host processor may not be required to stall during the transfer of data from flash 300 to the cache buffer 350. The host processor may issue periodic queries to the memory module to determine if the transfer of data from flash 300 to the cache buffer 350 is complete. Once the transfer of data from flash 300 to the cache buffer 350 is complete, the data movement from the cache buffer 350 to DRAM 340 may be implemented as instructions issued from the host processor to read from cache buffer 350 followed by writing to DRAM 340. Although the host processor may be required to stall during the transfer of data from cache buffer 350 to DRAM 340, the amount of latency introduced by this operation may be far less than the latency involved in the movement of data from flash 300 to cache buffer 350 or the latency involved in data movements from a disk or a solid-state disk in a system in which disk storage is provided in the I/O hierarchy.

In some embodiments as described herein, the host processor may be unaware that flash is present in the memory hierarchy. In addition, the above-defined method eliminates asynchronism between flash-related DRAM commands and other DRAM commands from the host processor (memory controller). The host processor may be aware of both types of commands in its command execution sequence. In one embodiment, if the cache buffer 350 becomes full, the host processor may be stalled while cache buffer 350 empties. In an alternative embodiment in which a disk or solid-state disk in the I/O hierarchy includes pages that are stored in flash, the host processor may service a page fault via the I/O hierarchy if there is insufficient space available in cache buffer 350 to accommodate a page.

In one embodiment, in the event that a page needs to be swapped between flash and DRAM as the result of a page fault, a hardware thread may populate a programmed I/O (PIO) store with a start address and an end address of a block to be transferred from flash to DRAM or DRAM to flash. The thread may then issue the PIO store to the configuration space of a coherence engine located within host processor 210. The coherence engine may be configured to ensure that the last level cache within the host processor, for example L2 cache 120 of FIG. 1, remains coherent while the page fault is serviced. The coherence engine may issue a global invalidate for every cache line that corresponds to the victim page. For example, in one embodiment, an 8 Kbyte page may correspond to 128 cache lines. The global invalidate may cause the corresponding cache lines to be labeled dirty. Subsequently, all dirty cache lines may be flushed from the cache. Once the caches have been flushed, the coherence engine may return an acknowledgment to the host processor's hardware thread that started the engine, indicating the PIO store is complete. In one embodiment, the PIO store may act as a memory barrier instruction enforcing an ordering constraint on younger loads and stores associated with the same hardware thread. In an alternative embodiment, the operating system operating on the host processor may select a page to be evicted from cache/DRAM and allocate physical address space for copying a new page from flash to DRAM that is declared to be non-shared or non coherent.

In response, to the coherence engine's acknowledgment of the first PIO store, the host processor may issue a second PIO store to the configuration space of a command engine to begin the process of transferring data from flash-to-DRAM or DRAM-to-flash. Transfers may make use of command engine microcode stored at system initialization time in data move configuration space 411. The second PIO store may define start and end addresses of the Flash-to-DRAM or DRAM-to-flash transfer microcode. In one embodiment, the start and end addresses may comprise head and tail pointers, respectively of a linked list. Alternatively, the start and end addresses may refer to a start point and end point in a ring buffer of microcode commands. The calling thread in the host processor may then issue another PIO store to the command engine to read the microcode commands from DRAM/L3 cache. After retrieving the last microcode command, the command engine may issue an acknowledgment to the host processor thread, signaling the host processor thread to leave the stalled state. The retrieved microcode commands may then be decoded and dispatched to memory controller 220 to be queued as writes to data move configuration space 411. A flash source or destination address and a flash transfer command are placed in the data portion of the write command. The host processor may then execute the queued write commands that flash controller 242 may detect and decode using pre-defined rules.

Figure 5:
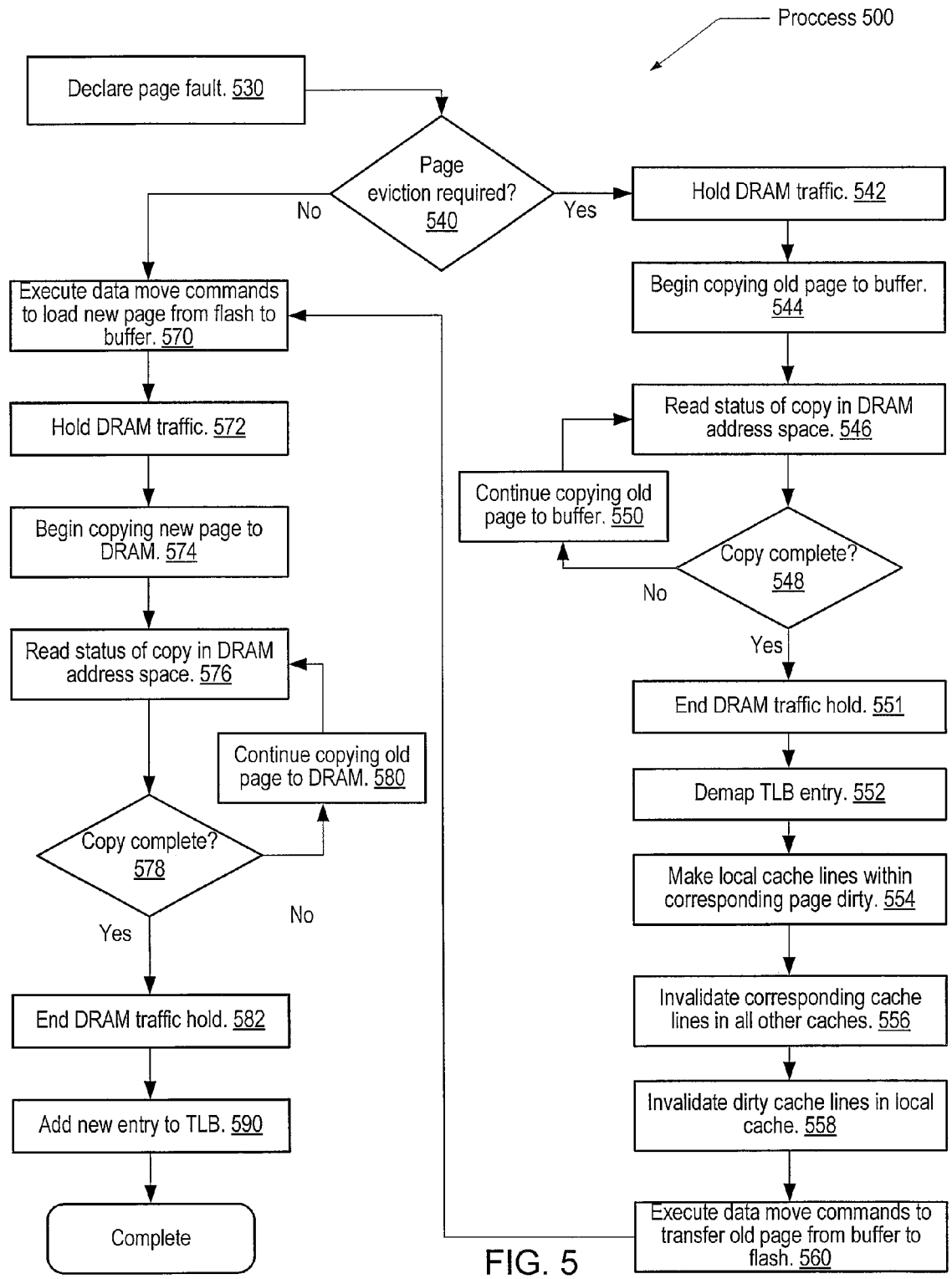
FIG. 5 illustrates one embodiment of a process that may be used to service a page fault.

FIG. 5 illustrates one embodiment of a process 500 that may be used to service a page fault. Process 500 may begin with declaration of a page fault (block 530). In one embodiment, a page fault may be declared in a virtual paging system in response to detecting a miss in a translation lookaside buffer (TLB) cache and/or a miss in a translation storage buffer (TSB) memory. If the TSB is full and space for a new entry can be made only by evicting a least recently used (LRU) entry from DRAM, an eviction may be required. If a sufficient number of invalid entries exist in the TSB, then a TLB miss may allocate such entries for allocation of a requested page and eviction of a page from DRAM is not required. If an eviction is required (decision block 540) DRAM traffic may be held (block 542) and the process of copying the evicted (old) page from DRAM to a buffer may begin (block 544). In one embodiment, support for holding DRAM traffic may be built into the memory controller. Alternatively, in legacy systems in which modification to the memory controller are not desirable, traffic may be held and status may be read for each cache line transfer instead of for a full page transfer. In this case, other DRAM traffic may be allowed between cache line transfers. Support for holding DRAM traffic and polling for status may be built into a software driver as a normal read from DRAM and write to cache buffer. These reads and writes may be passed transparently through the memory controller. During the copying process, the status of the process may be read from DRAM address space (block 546). For example, status may be polled at regular intervals such as at the DRAM refresh rate. If the copy process is not complete (decision block 548), the copy process may continue (block 550) and the status may be re-read (block 546). If the copy process is complete (decision block 548), the DRAM traffic hold may be ended (block 551). Subsequently, a page translation entry in a TLB and/or TSB may be demapped (block 552) and local cache lines that correspond to the targeted page may be marked as dirty (block 554). In addition, corresponding cache lines in other, non-local caches may be invalidated (block 556). Dirty cache lines may then be invalidated (block 558). Once the cache operations described above have been completed, data move commands may be executed to transfer the old page from the buffer to flash (block 560).

Upon completion of a page eviction, or if a page eviction is not required (decision block 540), process 500 may proceed to execute data move commands to transfer a new page from the flash to a buffer (block 570). Subsequently, commands to swap pages between flash and DRAM may be executed (block 560). DRAM traffic may be held (block 572) and the process of copying the new page from the buffer to DRAM may begin (block 574). During the copying process, the status of the process may be read from DRAM address space (block 576). If the copy process is not complete (decision block 578), the copy process may continue (block 580) and the status may be re-read (block 547). If the copy process is complete (decision block 578), the DRAM traffic hold may be ended (block 582) and a new page translation entry may be added to the TLB and/or TSB (block 590), completing the page fault processing.

Figure 6:
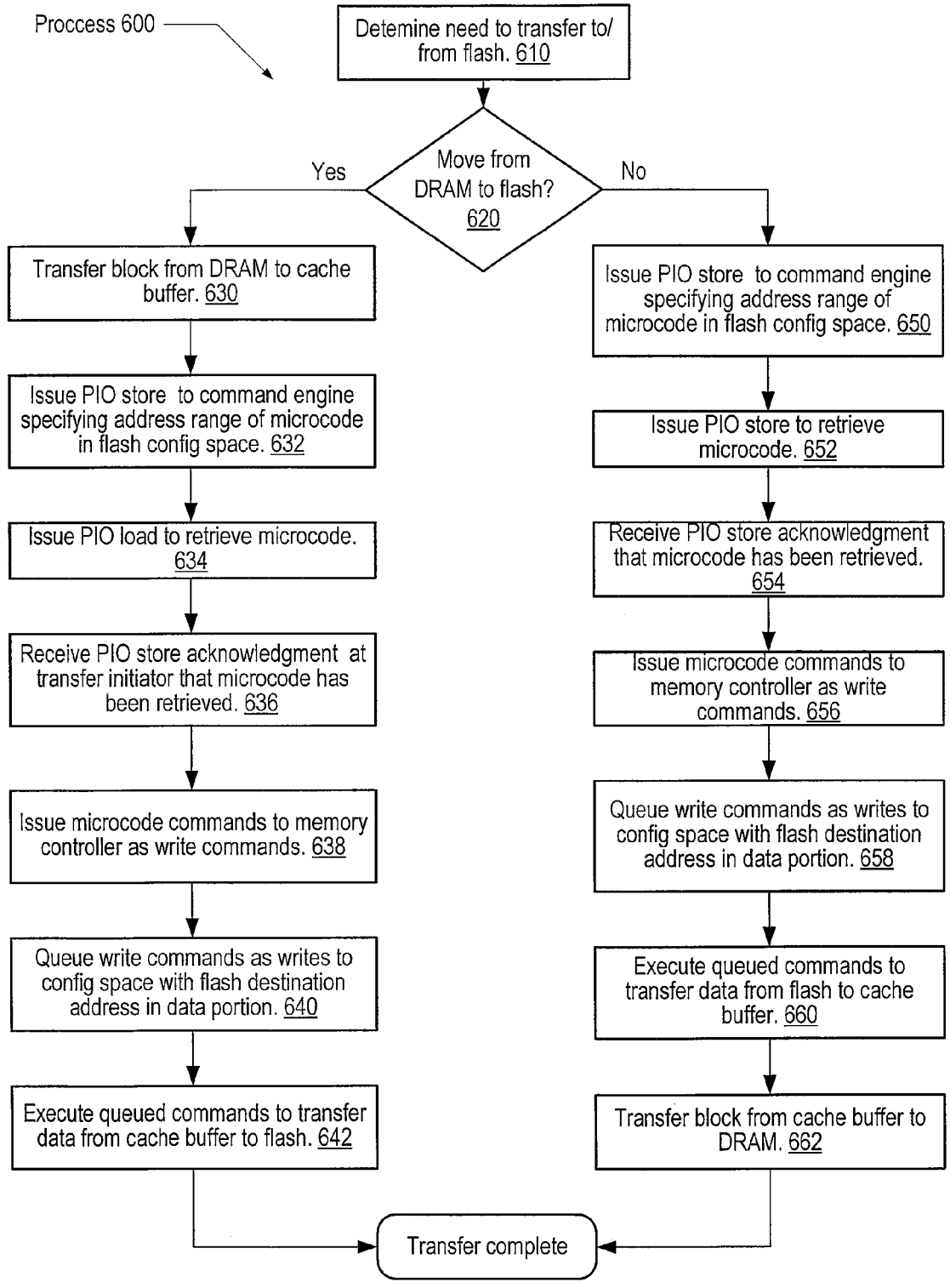
FIG. 6 illustrates one embodiment of a process that may be used to move data between flash memory and DRAM.

FIG. 6 illustrates one embodiment of a process 600 that may be used to move data between flash memory and DRAM. Process 600 may begin by determining that there is a need to transfer data to or from flash memory (block 610). If the transfer that is needed is to move a block of data from DRAM to flash (decision block 620), the block is first moved from DRAM to a cache buffer (block 630). Once the move to the cache buffer has completed, a programmed I/O (PIO) store may be issued to a command engine specifying an address range in a flash configuration space within the DRAM that encompasses microcode commands for performing a write to flash (block 632). A PIO load may then be sent to cause the command engine to retrieve the specified microcode commands (block 634). Upon completion of the retrieval of the microcode commands, the command engine may issue an acknowledgement to the initiator of the transfer and corresponding PIO load (block 636). The command engine may then issue each microcode command as a write command to a memory controller (block 638). The memory controller may queue the write commands as writes to the flash configuration space within the DRAM, including a destination address in the flash in the data portion of the command (block 640). The queued commands may then be executed to transfer the data block from the cache buffer to flash memory (block 642), completing process 600.

If the transfer that is needed is to move a block of data from flash to DRAM (decision block 620), a PIO store may be issued to the command engine specifying an address range in a flash configuration space within the DRAM that encompasses microcode commands for performing a read from flash (block 650). An additional PIO store may then be sent to cause the command engine to retrieve the specified microcode commands (block 652). Upon completion of the retrieval of the microcode commands, the command engine may issue an acknowledgement (block 654). The command engine may then issue each microcode command as a write command to a memory controller (block 656). The memory controller may queue the write commands as writes to the flash configuration space within the DRAM, including a destination address in the flash in the data portion of the command (block 658). The queued commands may then be executed to transfer the data block from flash memory to a cache buffer (block 660). The block may then be moved from the cache buffer to DRAM (block 662), completing process 600.

It is noted that in alternative embodiments, the individual blocks illustrated in processes 500 and 600 that are described in detail above may be executed in a different order and/or that some blocks may be executed in parallel with others. It is further noted that the above-described embodiments may comprise software. For example, the functionality of computer system 200 may be implemented in hardware, software, firmware, or some combination of the above. In such embodiments, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system, comprising:
   a processor coupled to a memory hierarchy via a memory controller;
   wherein the memory hierarchy includes a first memory region comprising random access memory and an auxiliary memory region comprising flash memory;
   wherein the memory controller is coupled to the auxiliary memory region via a flash controller;

wherein in response to detecting a page fault, the processor is configured to swap a page from the auxiliary memory region to the first memory region:
wherein a command sequencer within the processor executes a sequence of micro commands stored in the first memory region to move said data between the auxiliary memory region and the first memory region.

2. The computer system of claim 1, wherein the first memory region, the auxiliary memory region, and the flash controller comprise a dual-in-line module.

3. The computer system of claim 1, wherein the processor includes at least two processors that share the first memory region and the auxiliary memory region.

4. A computer system, comprising:
a processor coupled to a memory hierarchy via a memory controller and at least one cache memory;
wherein the memory hierarchy includes a first memory region comprising random access memory and an auxiliary memory region comprising flash memory;
wherein the memory controller is coupled to the auxiliary memory region via a flash controller;
wherein in response to detecting a page fault, the processor is configured to swap a page from the auxiliary memory region to the first memory region;
wherein the processor further comprises a coherence engine configured to:
detect a page fault corresponding to a request, and
in response to detecting the page fault, invalidate one or more cache lines in the at least one cache memory that correspond to the particular page; and
flush the one or more cache lines.

5. The computer system of claim 4, wherein prior to said move, the coherence engine is configured to flush the one or more cache lines.

6. A computer system, comprising:
a processor coupled to a memory hierarchy via a memory controller and at least one cache memory;
wherein the memory hierarchy includes a first memory region comprising random access memory and an auxiliary memory region comprising flash memory;
wherein the memory controller is coupled to the auxiliary memory region via a flash controller;
wherein in response to detecting a page fault, the processor is configured to swap a page from the auxiliary memory region to the first memory region;
wherein the first memory region and the auxiliary memory region are interconnected through a cache buffer;
wherein to move data from the first memory region to the auxiliary memory region, the processor is configured to:
read data from the first memory region to the cache buffer; and
write data from the cache buffer to the auxiliary memory region; and
wherein to move data from the auxiliary memory region to the first memory region, the processor is configured to:
read data from the auxiliary memory region to the cache buffer; and
write data from the cache buffer to the first memory region.

7. A method, comprising:
receiving a request from a processor to access a particular page in a first memory region of a memory hierarchy, the first memory region comprising random access memory;
detecting a page fault corresponding to the request, and
in response to detecting the page fault, swapping a page to the first memory region from an auxiliary memory region of the memory hierarchy, the auxiliary region comprising flash memory;
wherein swapping a page further comprises a command sequencer within the processor moving data between the auxiliary memory region and the first memory region, wherein moving data between the auxiliary memory region and the first memory region comprises executing a sequence of micro commands that are stored in the first memory region.

8. The method of claim 7, wherein the first memory region, the auxiliary memory region, and the flash controller comprise a dual-in-line module.

9. The method of claim 7, further comprising sharing the first memory region and the auxiliary memory region with at least two processors.

10. A method, comprising:
receiving a request from a processor to access a particular page in a first memory region of a memory hierarchy, the first memory region comprising random access memory;
detecting a page fault corresponding to the request, and
in response to detecting the page fault, swapping a page to the first memory region from an auxiliary memory region of the memory hierarchy, the auxiliary region comprising flash memory;
wherein the processor includes at least one cache memory and the method in response to detecting the page fault, includes invalidating one or more cache lines in the at least one cache memory that correspond to the particular page; and flushing the one or more cache lines.

11. The method of claim 10, wherein the one or more cache lines are flushed prior to moving data between the auxiliary memory region and the first memory region.

12. A method, comprising:
receiving a request from a processor to access a particular page in a first memory region of a memory hierarchy, the first memory region comprising random access memory;
detecting a page fault corresponding to the request, and
in response to detecting the page fault, swapping a page to the first memory region from an auxiliary memory region of the memory hierarchy, the auxiliary region comprising flash memory;
wherein the first memory region and the auxiliary memory region are interconnected through a cache buffer;
wherein moving data from the first memory region to the auxiliary memory region further comprises:
reading data from the first memory region to the cache buffer; and
writing data from the cache buffer to the auxiliary memory region; and
wherein moving data from the auxiliary memory region to the first memory region further comprises:
reading data from the auxiliary memory region to the cache buffer; and
writing data from the cache buffer to the first memory region.

13. A computer-readable storage medium containing instructions that, when executed, enable a memory controller to:
receive a request from a processor to access a particular page in a first memory region of a memory hierarchy, the first memory region comprising random access memory;
detect a page fault corresponding to the request;

in response to detecting the page fault, swap a page to the first memory region from an auxiliary memory region of the memory hierarchy, the auxiliary region comprising flash memory; and cause a command sequencer within the processor to execute a sequence of micro commands stored in the first memory region to swap the page.

14. A computer-readable storage medium containing instructions that, when executed, enable a memory controller to:

receive a request from a processor to access a particular page in a first memory region of a memory hierarchy, the first memory region comprising random access memory;

detect a page fault corresponding to the request; and in response to detecting the page fault, swap a page to the first memory region from an auxiliary memory region of the memory hierarchy, the auxiliary region comprising flash memory;

wherein the processor includes at least one cache memory and the instructions are further executable by a coherence engine within the processor to:

detect a page fault corresponding to the request;

in response to detecting the page fault, invalidate one or more cache lines in the at least one cache memory that correspond to the particular page; and flush the one or more cache lines.

15. A computer-readable storage medium containing instructions that, when executed, enable a memory controller to:

receive a request from a processor to access a particular page in a first memory region of a memory hierarchy, the first memory region comprising random access memory;

detect a page fault corresponding to the request; and in response to detecting the page fault, swap a page to the first memory region from an auxiliary memory region of the memory hierarchy, the auxiliary region comprising flash memory;

wherein the first memory region and the auxiliary memory region are interconnected through a cache buffer;

wherein moving data from the first memory region to the auxiliary memory region further comprises:

reading data from the first memory region to the cache buffer; and writing data from the cache buffer to the auxiliary memory region; and wherein moving data from the auxiliary memory region to the first memory region further comprises:

reading data from the auxiliary memory region to the cache buffer; and writing data from the cache buffer to the first memory region.

* * * * *